(12) United States Patent
Rose et al.

(10) Patent No.: US 7,011,122 B2
(45) Date of Patent: Mar. 14, 2006

(54) EDGE-ROUTING UNIT FOR A PROGRAM-CONTROLLED FEED-THROUGH MACHINE

(75) Inventors: Martin Rose, Espelkamp (DE); Karl-Heinz Schekelmann, Espelkamp (DE)

(73) Assignee: IMA Klessman GmbH Holzbearbeitungssysteme, Lubbecke (DE)

( * ) Notice: Subject to any disclaimer, the term of this patent is extended or adjusted under 35 U.S.C. 154(b) by 74 days.

(21) Appl. No.: 10/292,965

(22) Filed: Nov. 13, 2002

(65) Prior Publication Data
US 2004/0089376 A1 May 13, 2004

(51) Int. Cl.
B27C 5/00 (2006.01)

(52) U.S. Cl. ............... 144/134.1; 409/138; 409/195

(58) Field of Classification Search ............ 144/134.1, 144/136.95, 137, 154.5, 218; 409/138, 193, 409/195, 207; 83/73–75.5, 76.1, 76.8
See application file for complete search history.

(56) References Cited

U.S. PATENT DOCUMENTS 3,838,722 A * 10/1974 Downing .................. 144/118
3,941,173 A *  3/1976 Heimbrand et al. ..... 144/114.1
5,144,737 A *  9/1992 Riesmeier ................. 29/564.7
5,146,670 A *  9/1992 Jones ........................ 29/561
5,343,910 A *  9/1994 Reines ..................... 144/154.5
5,803,682 A *  9/1998 Henzler et al. ............. 409/138

FOREIGN PATENT DOCUMENTS

DE      37 32810 C1    9/1987
DE      40 30138 A1    3/1992
DE     196 44 137 A1    4/1998

* cited by examiner

Primary Examiner—Derris H. Banks
Assistant Examiner—Shelley Self
(74) Attorney, Agent, or Firm—Charles E. Baxley

(57) ABSTRACT

An edge-routing unit has a routing tool (4) on a shaft (9) of a routing motor (6), which is arranged on a rest (10), and which is controlled approximately along a workpiece outline in a workpiece feed-through direction, an X-axis, and in a workpiece thickness direction, a Z-axis. Furthermore, by way of a feeler wheel (5), which is coaxial to the routing tool (4) and which travels over a workpiece surface adjoining an edge strip (3), the rest (10) is supported on the workpiece (1) for follow-up of the routing tool (4) according to a contour sensed. In order to be able to change adjustment of the routing tool (4) relative to the feeler wheel (5) during machining operations, a positioning slide (15) is arranged on the rest (10), on which the positioning slide (15) and the routing motor (6) sit together with the routing tool (4) and which is traversable in a motor-operated program-controlled manner relative to the rest (10), in a direction of the X-axis and in a direction of the Z-axis.

4 Claims, 4 Drawing Sheets

EDGE-ROUTING UNIT FOR A PROGRAM-CONTROLLED FEED-THROUGH MACHINE

BACKGROUND OF THE INVENTION

1. Field of the Invention

The present invention relates to a unit for a programmed-controlled feed-through machine. More particularly, the present invention relates to an edge-routing unit for a program-controlled feed-through machine.

2. Description of the Prior Art

DE 40 30 138 A1 teaches a machine having an edge-routing unit of a generic type. Such a routing unit is controlled via a feeling device having a feeler wheel, as can be seen more clearly from U.S. Pat. No. 2,839,107.

For exact flush routing of an edge strip glued onto narrow surface sides of workpieces, it is not sufficient, on one hand, to preset paths to be covered in an X-axis and a Z-axis with a routing tool in a machine control program and, on the other hand, to merely follow up with the routing tool along a workpiece contour sensed by a feeler wheel.

In this case, it has to be taken into account that, in a direction of the X-axis of the machine, a relevant positioning device mainly controls running of the routing tool together with a respective workpiece to be machined over a short distance. In addition, a path contour to be covered is preset by the program control of the machine so as to be smaller than a workpiece outline, so that there is a feeling clearance due to an undersize relative to a theoretical workpiece outline. This feeling clearance being necessary so that a more accurate follow-up of the routing tool according to an actual workpiece outline contour is possible via the feeler wheel.

An entire path positioning of the routing tool has its own dynamics, which, during changes in direction at the workpiece contour, in particular at corners or rounded portions having a small radius of curvature, leads to inaccuracies at workpiece corners lying at a front and a rear in a workpiece feed-through direction. Thus, too much of the edge strip may be removed at one location, in which case the routing tool starts to cut panel material. At another location, a projection of the edge strip relative to an adjoining workpiece surface may remain.

In order to be able to partly compensate for such errors during flush routing, the routing tool is adjustable relative to the feeler wheel in known edge-routing units. Consequently, at least as viewed in a direction transversely to the X-axis of the machine, that is to say, in the direction of the Y-axis, the routing tool is not located where the feeler wheel travels over a workpiece surface, and therefore cutting operation with the routing tool does not take place exactly where sensing of the workpiece is effected.

Depending on whether the edge-routing unit, in addition to one of two longitudinal edges of the edge strip, is provided for trimming either that edge of the edge strip which lies at the front in the feed-through direction or that edge of the edge strip which lies at the rear in the feed-through direction, lengths of which edges depend on thickness of the workpiece, either a certain advance of the feeler wheel or a lag of the feeler wheel relative to the routing tool is firmly set. This requires empirical determination during trial passes of workpieces and a manual adjustment of the routing tool relative to the feeler wheel when the machine is stopped, which is associated with considerable set-up times when changing over the edge-routing unit to a respective workpiece configuration.

Nonetheless, such firmly set corrections of routing inaccuracies, when machining operation is taking place, lead to a situation in which compensation of a routing inaccuracy at one location entails a routing error at another location, for which reason considerable effort is required to work out an optimum of requisite corrections.

SUMMARY OF THE INVENTION

The object of the present invention is to provide an edge-routing unit which adjustment of a routing tool relative to a feeler wheel can be changed during machining operations on workpieces.

For the present invention, it is essential that not only can positioning of the routing tool be carried out in a motor-operated manner, but that positioning drives provided for this constitute additional machine axes which are also taken into account in program control of the feed-through machine. Thus, follow-up of the routing tool along a workpiece contour by the feeler wheel and guidance of the routing tool along with the workpiece passing through by an X-positioning device are still effected.

The fine adjustment of the routing contour to be covered, however, is effected via the two positioning drives on a rest carrying the routing tool. Since a respective position of the positioning drives is preset by the machine control program, positional changes of the positioning drives which turn out to be necessary during a trial run of workpieces can be stored in the control program and can be changed again if required. These are positional changes of the routing tool relative to the feeler wheel, which are carried out during machining operation on a workpiece passing through. Additional positioning drives, which are set up for a fine adjustment of the routing tool down to fractions of a millimeter, work in an interpolating or superimposing manner relative to the positioning devices which control a path of the routing tool in an X-Z-plane.

Such automatic axis positioning of the routing tool is especially advantageous if the routing tool is designed as a multi-function tool in a form of a stepped router and has cutting edges arranged on steps of different diameters. In this case, a corresponding number of feeler wheels, which have correspondingly different diameters, must be provided. Thus, the appropriate control of the positioning drives in the machine program can also be provided for each cutting-edge step of the multi-function tool and an associated feeler wheel with a same diameter.

In order to be able to more exactly position, in particular, form routers for rounded edges on an edge strips applied to narrow surface sides of the workpiece, it is advantageous to additionally provide a positioning drive for the rest carrying a positioning slide. This positioning drive effects an adjustment of the routing tool transversely to an X-axis, in a conventional Y-axis. This also increases machining accuracy, and tool wear can be taken into account.

BRIEF DESCRIPTION OF THE DRAWING

The present invention is explained in more detail below with reference to the drawing and an exemplary embodiment. In the drawing:

FIG. 8 is a diagrammatic view of two edge-routing units, corresponding to one another, for successive machining of a top and a bottom edge of workpieces passing through.

DETAILED DESCRIPTION OF THE PREFERRED EMBODIMENT

Figure 1:
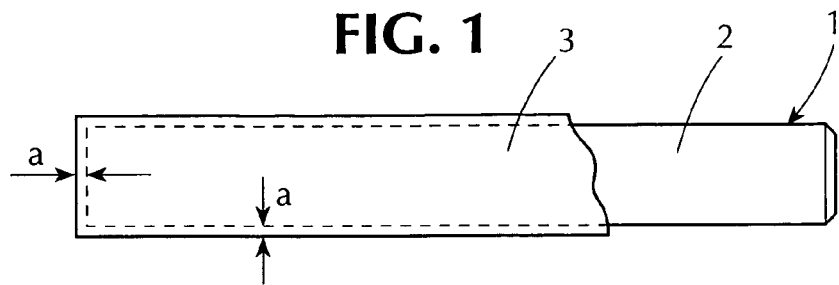
FIG. 1 is a diagrammatic view of one of narrow surface sides of a plate-shaped workpiece with an edge strip applied thereto.

A plate-shaped workpiece 1 can be seen in detail in FIG. 1, wherein an edge strip 3, made of a suitable edge material, is glued onto a narrow surface side 2 of the workpiece 1. With a projection a, which need not be uniform, the edge strip 3 projects on all sides beyond edges defining the narrow surface side 2 of the workpiece 1.

Figure 2:
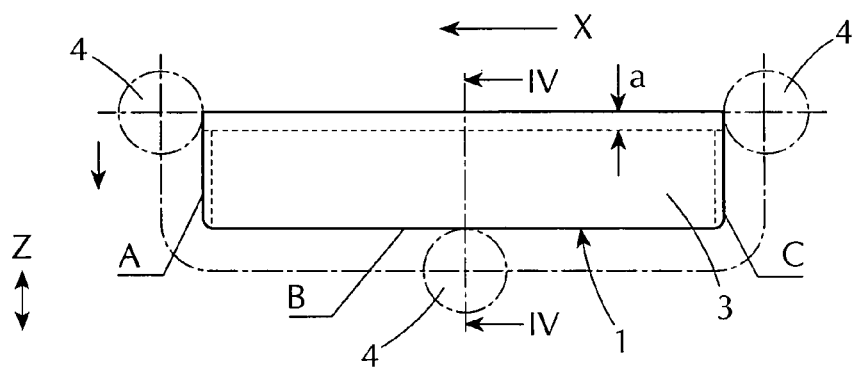
FIG. 2 is a diagrammatic view of the plate-shaped workpiece according to FIG. 1, but after a first machining operation, for illustrating a machining path of a relevant routing tool.

The edge strip 3 is applied to the narrow surface side 2 of the workpiece 1 in a "feed-through machine," in which the workpieces 1, resting horizontally on a transport device, are conveyed along individual machining stations. In a trimming station of such a machine, the projection a of the edge strip 3 is removed by means of a routing tool 4, the guidance of which along a program-controlled path is illustrated in FIG. 2. A relevant workpiece 1 passes through the trimming station in a direction of an X-axis of the feed-through machine, in which the routing tool 4 is guided along with the workpiece 1 over a short distance.

The routing tool 4 trims the edge strip 3 first along that corner edge of the workpiece 1 which lies at a front in a feed-through direction. In the process, the routing tool 4 travels through a region A shown in FIG. 2, in which the routing tool 4 must be guided along in the direction of the X-axis at a feed-through speed of the workpiece 1. At a same time, the routing tool 4 is traversed in a vertical direction, that is to say, in a direction of a Z-axis of the machine. After that, the routing tool 4 trims the edge strip 3 along a bottom longitudinally running edge of the workpiece 1, which region is designated by B in FIG. 2. In this region, the workpiece 1 and the routing tool 4 are moved relative to one another in the direction of the X-axis of the machine, for example, the tool 4 can be stopped here in the direction of the X-axis, whereby the feed-through speed of the workpiece 1 is a speed relative to the routing tool 4. Finally, the routing tool 4 machines that corner edge of the workpiece 1 which lies at a rear in the feed-through direction of the workpiece 1. In a corresponding region, designated by C in FIG. 2, the routing tool 4 is again moved along with the workpiece 1 in the direction of the X-axis, that is to say, it is traversed at the feed-through speed, and an upward stroke of the routing tool 4 in the direction of the Z-axis is superimposed.

After completion of workpiece engagement, the routing tool 4 is returned again into its initial position. To complete the trimming, the edge strip 3 is trimmed by a second routing tool along a top longitudinally running edge of the workpiece 1, which is explained below with reference to FIG. 8.

A path which is covered by the routing tool 4 in an X-Z-plane does not correspond to an actual outline of the workpiece 1 in an entire region covered, that is to say, in the regions A, B, and C according to FIG. 2. On the contrary, a path curve is preset with an undersize relative to the workpiece outline by the control program of the machine, and so that the routing tool 4 does not cover the path curve with this undersize, compensating control of the routing tool 4 is effected via a feeler roller 5, which senses a workpiece surface close to the edge strip to be trimmed. This is shown in a schematic representation by FIG. 3, which also indicates a transport device 7 on which the workpieces 1 are conveyed lying flat through the trimming station of the feed-through machine.

Figure 3:
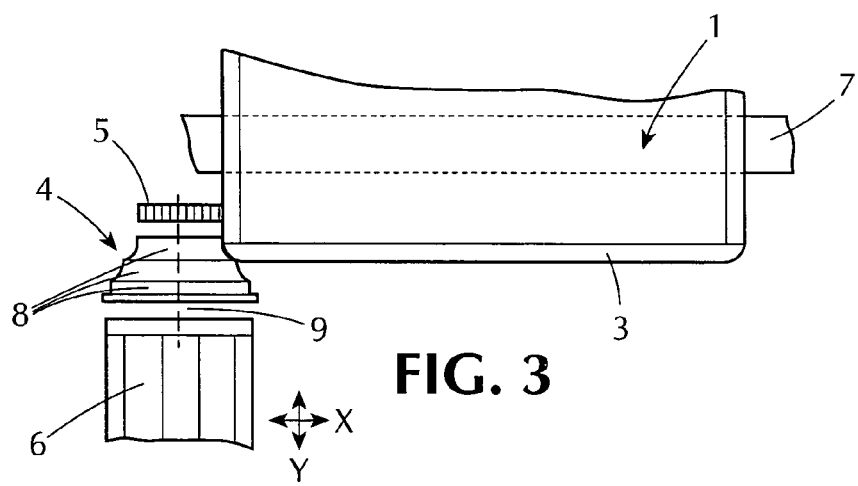
FIG. 3 is a diagrammatic plan view of the workpiece according to FIGS. 1 and 2, with a routing unit engaged thereon.

It is also shown in FIG. 3 that the routing tool 4 sits directly on a shaft 9 of a routing motor 6, and has a plurality of steps of different diameter in order to be able to be adapted to various routing conditions.

Figure 4:
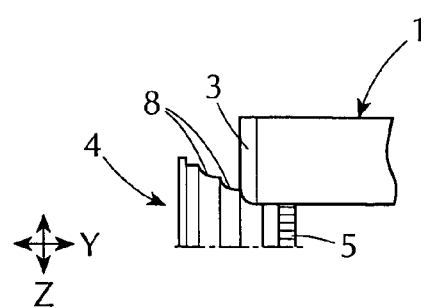
FIG. 4 is a partial diagrammatic cross sectional view through the workpiece according to FIG. 2 along line IV—IV.

As can also be seen in FIGS. 3 and 4, the feeler wheel 5 is arranged largely coaxially to the routing tool 4 and yet can be adjusted relative to the routing tool 4, both in the directions of the X-axis and the Z-axis and in the direction of the Y-axis, to be precise during machining operation on a respective workpiece 1.

Figure 5:
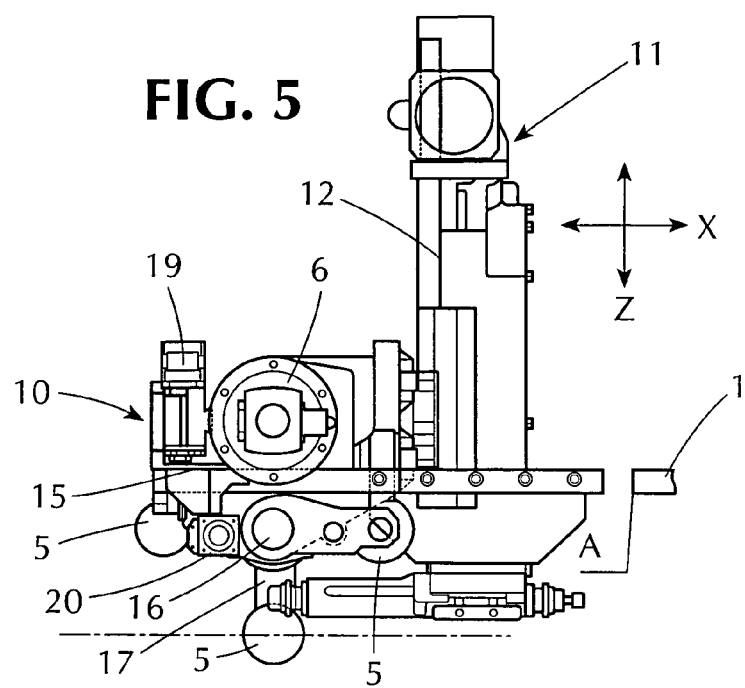
FIG. 5 is a diagrammatic side view of a complete edge-routing unit, as viewed in a direction of a Y-axis of the machine.
Figure 6:
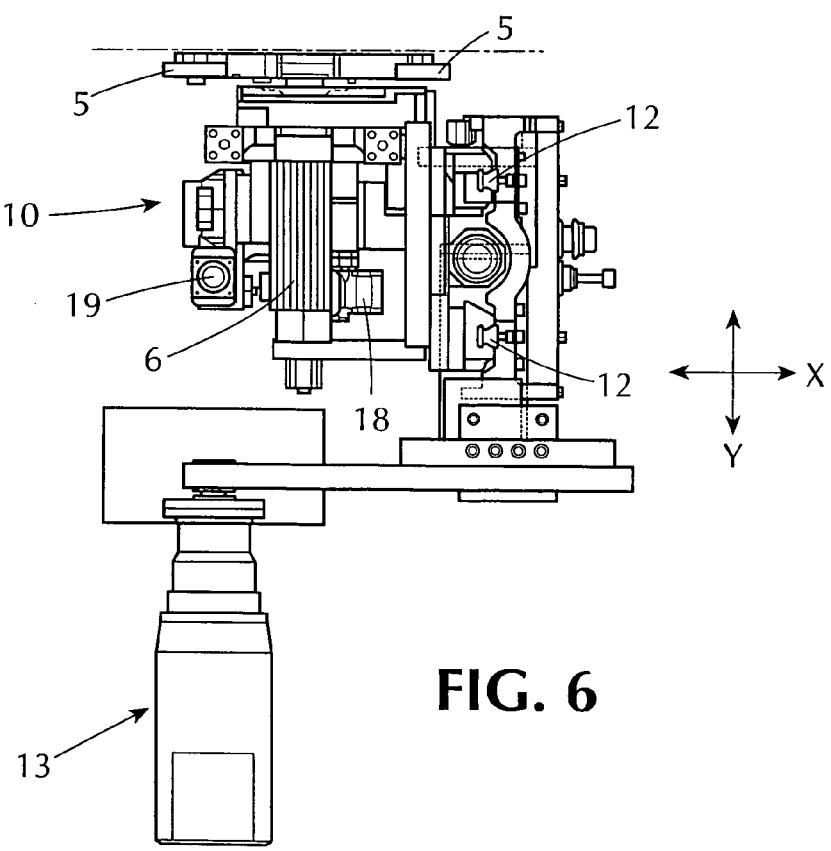
FIG. 6 is a diagrammatic plan view of the edge-routing unit according to FIG. 5.
Figure 7:
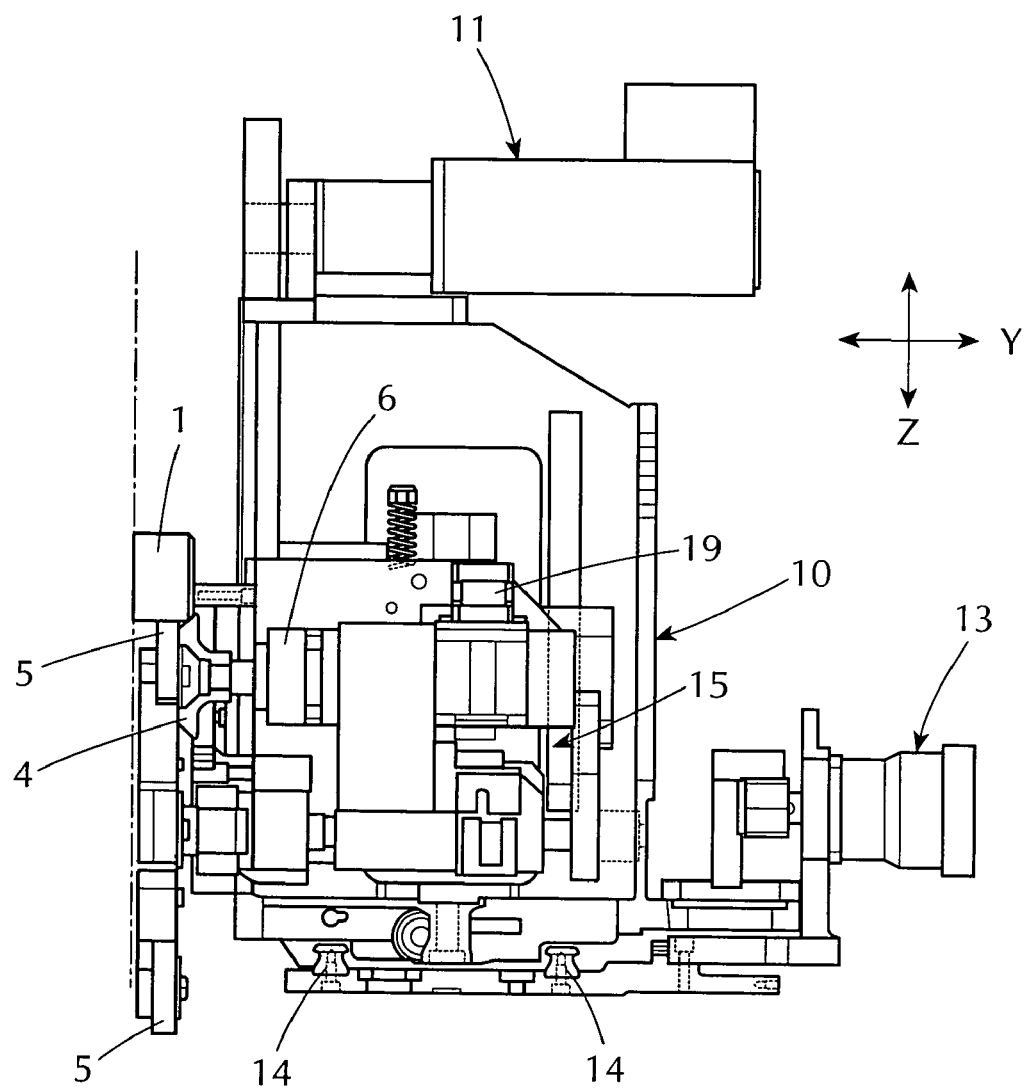
FIG. 7 is a diagrammatic side view of the edge-routing unit according to FIGS. 5 and 6, as viewed in a direction of an X-axis of the machine.

In addition, as FIGS. 5, 6, and 7 show, the routing motor 6 together with the routing tool 4 are arranged on a rest 10, which can be traversed in the X-axis and in the Z-axis of the machine, in order to follow the path curve preset by the machine control program. To this end, there is a first positioning device 11 having a guide system 12. The positioning device 11 effects traverse of the rest 10 in the Z-axis of the machine.

With reference to FIG. 2, the traverse of the rest 10 in the direction of the Z-axis is necessary in order to be able to machine the edge strip 3 on the workpiece 1 in the regions A and C. To this end, however, simultaneous guidance of the rest 10 along with the workpiece 1 passing through is necessary. For this purpose, there is a further positioning device 13 having a guide system 14, via which the rest 10 is traversed in the X-axis, to be precise at the feed-through speed of the workpiece 1, as long as the regions A and C of the edge strip 3 on the workpiece 1 are being machined. During changeover into the region B, a resulting movement of the rest 10 in the two machine axes A and Z can also be effected via the positioning devices 11 and 13 in order to rout, for example, rounded portions on the corners of the workpiece 1 or on the edge strip 3 forming the workpiece corners.

A positioning slide 15 is arranged on the rest 10, which, furthermore, carries a pivot 16, on which pivot arms 17 project radially, on ends of which, feeler wheels 5 of different diameters are mounted. These feeler wheels 5 correspond to individual diameters of a stepped routing tool. In each case, in accordance with that step of the routing tool 4 which is used, an associated feeler wheel 5 can be pivoted into position coaxial or approximately coaxial to the routing tool 4. Position of each individual feeler wheel 5 in a respective feeling position at a relevant workpiece 1 depends solely on position of the rest 10. This position is reset via the positioning devices 11 and 13. This is important insofar as the routing tool 4, together with the routing motor 6, can assume a position other than an exactly coaxial position to the respective feeler wheel 5.

This is because a special feature consists in a fact that the positioning slide 15 can be adjusted in a motor-operated manner relative to the rest 10, at least in the direction of the X-axis and in the direction of the Z-axis, and preferably also in the direction of the Y-axis, which is carried out via the machine program and can be stored there accordingly.

Arranged for this purpose on the rest 10 is an X-positioning drive 18, which interacts with a corresponding guide, running in the X-direction, for the positioning slide 15. In the same way, a Z-positioning drive 19 and a Y-positioning drive 20 having corresponding guides for the positioning slide 15 are provided on the rest 10.

The X-positioning drive 18, the Z-positioning drive 19, and the Y-positioning drive 20 can be activated while trimming of the edge strip 3 on the workpiece 1 is being carried out. Accordingly, adjusting movements of the positioning slide 15 are superimposed on traverse movements of the rest 10, which are effected via the positioning devices 11 and 13. A fine adjustment of the routing tool 4 can thus be carried out via the positioning slide 15. This fine adjustment automatically compensates for traverse errors in entire positioning of the routing tool 4, which are determined by machine dynamics.

Figure 8:
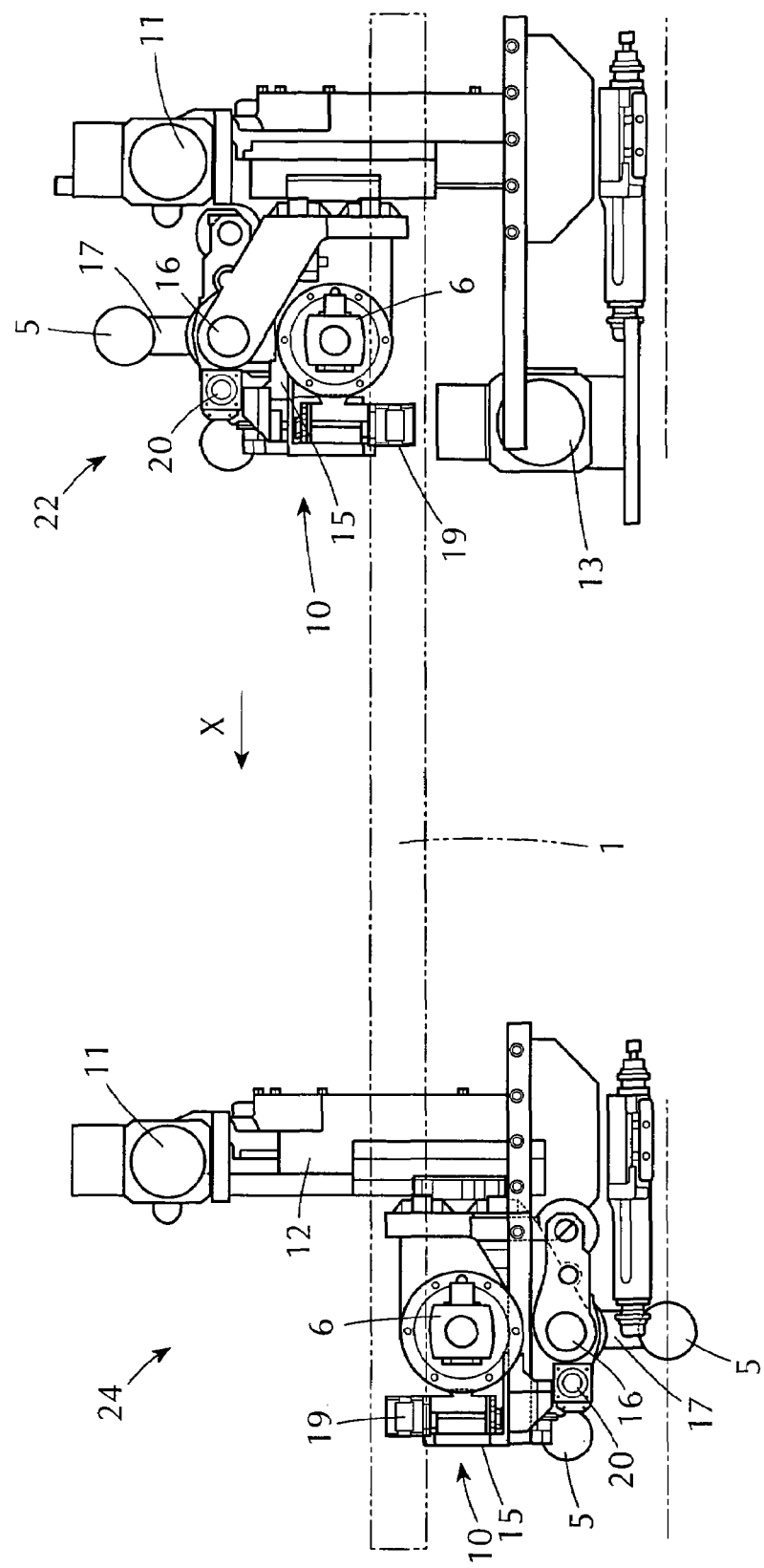

As FIG. 8 shows, a first edge-routing unit 22 for machining of top longitudinally running edges of the workpiece 1 and a second edge-routing unit 24 for machining of bottom longitudinally running workpiece edges and of edges running in a thickness direction of the workpieces 1 are expediently provided, one behind the other, in the trimming station of the feed-through machine, in the feed-through direction of the workpieces 1. Thus, the edge-routing unit 24 shown in FIG. 8 corresponds to an embodiment according to FIGS. 5 to 7, discussed above. The edge-routing unit 22 shown on the right in FIG. 8 for machining of the top longitudinally running edges of the workpieces 1, is of largely a same construction as the routing unit following in the feed-through direction. This essentially merely involves an arrangement of individual unit elements in mirror images.

The invention claimed is:

1. An edge-routing unit for a program-controlled feed-through machine for machining plate-shaped workpieces (1), wherein each plate-shaped workpiece (1) has a workpiece outline, a narrow surface side (2), a workpiece surface with a contour, a feed-through direction, a longitudinal direction lying in the feed-through direction thereof, and is made of at least one of wood and wood substitutes for panels for one of furniture making and interior finishing, wherein the narrow surface side (2) of each plate-shaped workpiece (1) has thereon an edge strip (3) with a projection, and wherein the machine has a workpiece feed-through direction which is an X-axis and a workpiece thickness direction which is a Z-axis, the edge-routing unit comprising:
a) a routing motor (6);
b) a rest (10);
c) positioning devices (11, 12; 13, 14);
d) a feeler wheel (5);
e) a fine-positioning slide (15);
f) an X-positioning drive (18);
g) a Z-positioning drive (19); and
h) a routing tool (4);
wherein the routing motor (6) has a shaft (9);
wherein the routing tool (4) has a diameter;
wherein the routing tool (4) is on the shaft (9) of the routing motor (6);
wherein the routing tool (4) is arranged on the rest (10);
wherein the routing tool (4) by way of the positioning devices (11, 12; 13, 14) is controlled so as to run approximately along the workpiece outline and partly with a respective workpiece over a short distance in the workpiece feed-through direction, the X-axis, and perpendicularly thereto in the workpiece thickness direction, the Z-axis;
wherein the feeler wheel (5) is coaxial to the routing tool (4);
wherein the feeler wheel (5) has a diameter;
wherein said diameter of the feeler wheel (5) is equal to the diameter of the routing tool (4);
wherein the feeler wheel (5) travels over the workpiece surface adjoining the edge strip (3);
wherein the feeler wheel (5) is supported on the workpiece (1) for follow-up of the routing tool (4) according to the contour sensed by the feeler wheel (5);
wherein the routing motor (6) is adjustable together with the routing tool (4) on the rest (10) relative to the feeler wheel (5);
wherein the fine-positioning slide (15) is arranged on the rest (10);
wherein the fine-positioning slide (15) and the routing motor (6) sit together with the routing tool (4) on the rest (10); and
wherein the fine-position slide (15) is traversable in a motor-operated program-cotrolled manner relative to the rest (10) in the direction of the X-axis and in the direction of the Z-axis, for which purpose the X-positioning drive (18) and the Z-positioning drive (19) are arranged on the rest (10).

2. The edge-routing unit as claimed in claim 1; further comprising a Y-positioning drive (20);
wherein the fine-positioning slide (15) is additionally traversable on the rest (10) in a motor-operated manner in a direction of the Y-axis transversely to the workpiece feed-through direction, for which purpose the Y-positioning drive (20) is arranged on the rest (10).

3. The edge-routing unit as claimed in claim 1; further comprising pivot arms;
wherein the routing tool (4) is a multi-function tool in a form of a stepped router having cutting edges arranged on steps of different diameters, and there are a corresponding number of feeler wheels (5) having various diameters, and these feeler wheels (5) are mounted on the pivot arms (17), oriented radially with one another and arranged on the rest (10) on a common pivot (16), and can each be pivoted into a position of one of coaxial to and approximately coaxial to the routing tool (4).

4. The edge-routing unit as claimed in claim 1; further comprising pivot arms;
wherein the routing tool (4) is a multi-function tool in a form of a stepped router having cutting edges arranged on steps of different diameters, and there are a corresponding number of feeler wheels (5) having various diameters, and these feeler wheels (5) are mounted on the pivot arms (17), oriented radially with one another and arranged on the rest (10) on a common pivot (16), and can each be pivoted into a position of one of coaxial to and approximately coaxial to the routing tool (4).

* * * * *